United States Patent [19]

Winogrocki

[11] Patent Number: 4,695,682

[45] Date of Patent: Sep. 22, 1987

[54] SEAT SWITCH

[76] Inventor: Ray F. Winogrocki, 18975 Holbrook, East Detroit, Mich. 48021

[21] Appl. No.: 812,426

[22] Filed: Dec. 23, 1985

[51] Int. Cl.⁴ .............................................. H01H 9/00
[52] U.S. Cl. .................................. 200/5 R; 200/6 R; 297/330
[58] Field of Search ................... 297/330; 200/4, 5 R, 200/5 A, 6 R, 6 A, 16 C, 16 D, 17 R, 18

[56] References Cited

U.S. PATENT DOCUMENTS

| | | | |
|---|---|---|---|
| 4,245,137 | 1/1981 | Hirai et al. ............................... | 200/4 |
| 4,330,694 | 5/1982 | Ogawa ..................................... | 200/6 A |
| 4,454,390 | 6/1984 | Gmeiner et al. ................ | 200/6 R X |
| 4,467,252 | 8/1984 | Takeda et al. ................... | 297/330 X |
| 4,473,724 | 9/1984 | Suzuki ........................... | 200/52 R X |
| 4,475,015 | 10/1984 | Kobayashi et al. ................. | 200/5 R |

Primary Examiner—J. R. Scott
Attorney, Agent, or Firm—Robert P. Hayter

[57] ABSTRACT

A seat switch and system for operating a power seat are disclosed. The seat switch includes a seat bench knob and a seat back knob, each mounted to be displaced by the operator to indicate the desired displacement of the seat bench and seat back. A mechanical connection is provided from the knob to a set of contacts such that the contacts are appropriately displaced relative to a pattern of contact pads. Appropriate signals are generated to indicate the desired motion of the seat based on the contacts engaging the contact pads. These signals are interpreted and appropriate motors actuated to displace the seat to obtain the desired seat positions.

20 Claims, 9 Drawing Figures

| SEAT BASE SWITCH CONTACTS | | | | ACTION |
|---|---|---|---|---|
| 1 | 2 | 3 | 4 | |
| 0 | 0 | 0 | 0 | NEUTRAL |
| 1 | 0 | 0 | 0 | RAISE FORWARD END OF SEAT BASE |
| 0 | 1 | 0 | 0 | LOWER FORWARD END OF SEAT BASE |
| 0 | 0 | 1 | 0 | LOWER BACK END OF SEAT BASE |
| 0 | 0 | 0 | 1 | RAISE BACK END OF SEAT BASE |
| 1 | 1 | 0 | 0 | MOVE SEAT BASE FORWARD |
| 0 | 0 | 1 | 1 | MOVE SEAT BASE AFT |
| 1 | 0 | 0 | 1 | RAISE BOTH ENDS OF SEAT BASE |
| 0 | 1 | 1 | 0 | LOWER BOTH ENDS OF SEAT BASE |
| 1 | 0 | 1 | 0 | RAISE FORWARD END AND LOWER BACK END OF SEAT BASE |
| 0 | 1 | 0 | 1 | LOWER FORWARD END AND RAISE BACK END OF SEAT BASE |

*FIG. 6*

SEAT SWITCH

BACKGROUND OF THE INVENTION

This invention relates to a multi-position switch for controlling the positioning of an article and a system for accomplishing such positioning. More specifically, the herein invention is directed to a seat switch for use in a motor vehicle. The seat switch is manually operated by displacement of a pair of knobs similar in appearance to a seat back and seat bench. The knobs are displaced to indicate the desired movement of the seat bench and seat back such that motion of the switch results in similar motion of the article to be controlled. This type of seat in a motor vehicle is referred to as an "eight-way" power seat.

It has become desirable to provide power seats in motor vehicles. A power seat typically has appropriate motors for controlling the lowering and raising of both the front and back ends of the seat bench and the translation of the entire seat fore and aft in the vehicle. Additionally, means are provided for moving the seat back fore and aft to change to relative inclination between the seat back and the seat bench.

One motor vehicle manufacturer currently sells a car having a power seat system including seat switches, one located in each front door. The switch has a knob designed to simulate the seat bench and a separate knob designed to simulate the seat back. These knobs are manually displaced in the manner in which it is desired to have the seat displaced to adjust the seat to the desired position. This particular switch referenced has a multiplicity of parts including eight rotating contacts, each displaced by an appropriate actuator. The switch is of significant size, and complexity and utilizes a separate contact to perform each switching function.

The herein invention is directed to a seat switch having substantially similar inputs. Both a seat bench knob and the seat back knob are provided, each capable of simulating the desired motion of the seat. However, with the herein design substantially fewer parts and a substantially smaller-sized switch are provided. Additionally, the switching function is achieved utilizing fewer contacts.

By reducing the size of the switch it is more readily incorporated into the vehicle door. By reducing the complexity of the switch, it may be manufactured at a significantly improved cost. By providing a series of contacts located on a printed circuit board, the switch may provide inputs to a microprocessor for effecting appropriate control of the seat and does not require one power-carrying contact for each switching function.

SUMMARY OF THE INVENTION

It is an object of the present invention to provide an improved seat switch.

It is a further object of the present invention to provide a multi-function seat switch of relatively shallow depth.

It is a still further object of the present invention to provide a seat switch having a reduced number of parts.

It is a yet further object of the present invention to provide a seat switch having a reduced number of contact pads for providing an appropriate signal upon displacement of the switch.

It is a yet further object of the present invention to provide a safe, economical, reliable, easy to service and maintain seat switch and system for controlling a seat.

Other objects will be apparent from the description to follow and the appended claims. The above objects are achieved according to a preferred embodiment of the invention by the provision of a seat switch for providing positioning signals as an input to a control system for positioning an automotive seat. A seat-base shaped, seat-base switch knob, which defines a centered, vertically-elongated cage pin slot and two horizontal pin slots, one on either side of the caged pin slot, is capable of horizontal, vertical and rotational motion. The casing which defines a pin opening includes cam guides and a torsion spring embossment. An up-down driver is mounted on one side of the casing, said driver including a pair of pins projecting through the pin openings in the casing and each being engaged in the horizontal slots of the knob. Said driver further includes a pair of spaced projections extending in the opposite direction and defines a vertically-elongated central opening. A sliding cam is secured for sliding movement within the casing cam guides, said cam defining a V-shaped engagement slot which mates with a driver pin such that displacement of the driver causes displacement of the cam. The torsion spring is mounted to the casing embossment and is positioned to displace the cam against the carrier guide to position the driver pin such that the cam is biased to a neutral position which acts to bias the up-down driver to a neutral position. A cage assembly defines a pair of projection slots and a cage pin, said cage pin extending through the driver opening and through the casing opening to be engaged within the cage pin slot defined by the knob. A pair of carriers is provided. Each carrier is slidably mounted to the cage assembly and has a projection extending through the cage assembly projection slots and engaging an up-down driver projection such that the displacement of the up-down driver causes sliding displacement of the carriers within the cage assembly. A pattern of electrical contacts each having two spaced-apart contact surfaces are provided with one contact being secured within each carrier. A pair of electrical contact pads positioned to be engaged by the electrical contacts are provided such that said contact pads and said electrical contacts generate a different positioning signal for each desired motion of the seat depending upon the position of the seat base switch knob.

Additionally, disclosed is a power seat system for controlling the positioning of a seat in a vehicle, said seat having a bench portion and a back rest portion. The system includes a seat having a seat bench and a seat back pivotally mounted to the seat bench, motive means connected between the vehicle and the seat to effect fore and aft movement of the seat, up and down movement at both the front and back of the seat bench and fore and aft movement of the seat back, and a control means connected to receive input signals and connected to the motive means for supplying power to selected portions of the motive means for effecting the desired positioning of the seat based on the input signals received. A seat switch for generating an input signal to the control means, including a bench knob simulating the bench portion of the seat is further disclosed. Said bench knob is capable of up movement, down movement, fore movement, aft movement, rotational movement at one end only, and rotational movement at both ends simultaneously. Said bench knob is connected to displace a plurality of contacts relative to a pattern of contact pads, said contacts and contact pads acting to generate an appropriate input signal to the control means based on the position of the bench knob to control the displacement of the bench portion of the seat.

BRIEF DESCRIPTION OF THE DRAWINGS

FIG. 6 is a table showing potential inputs from the seat base switch contacts and the seat movement desired for each set of inputs.

DESCRIPTION OF THE PREFERRED EMBODIMENT

A seat switch and a power seat system designed for use in a motor vehicle are hereinafter described.

It is to be understood that this switch has applicability to other applications and is not limited solely to a motor vehicle. Additionally, as used herein the terms seat base and seat bench are interchangeable. Additionally, the term seat back and back rest are likewise interchangeable.

Figure 1:
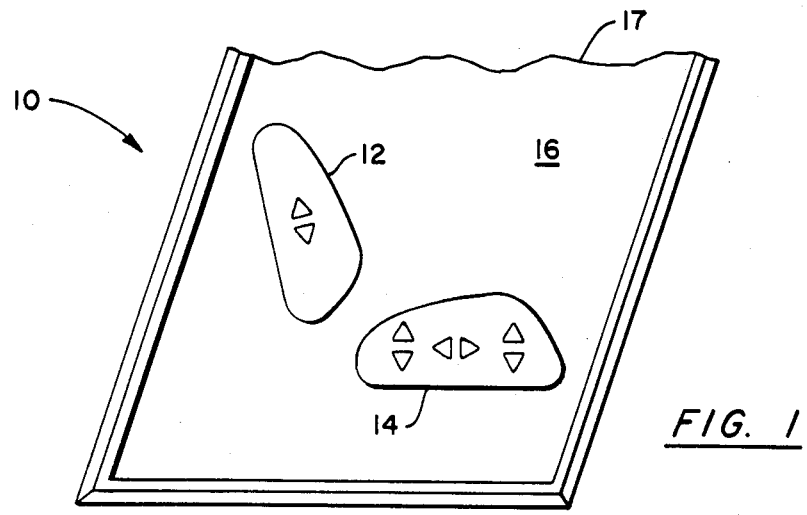
FIG. 1 is a front view of a seat switch showing the seat base switch and the seat back switch.

Referring first to FIG. 1, there may be seen a front view of seat switch 10. Seat switch 10 is mounted to casing 17 having face plate 16. This casing typically forms a module which may be inserted into a vehicle door and may include functions other than those as set forth herein. As shown in FIG. 1, seat switch 10 includes seat base knob 14 and seat back knob 12. Each of these two knobs has arrows thereon which indicate to the operator the potential manner in which the knob may be displaced. For instance, seat back knob 12 is pivotally mounted towards the bottom of the knob. Hence, this seat back knob may be rotated with the top end being displaced either to the left or to the right as the arrows show. Such displacement will result in the actual seat back being displaced to change the angle of inclination between the seat back and the seat base.

Seat base knob 14 is capable of motion in multiple directions. The entire knob may be moved upwardly to raise the seat, downwardly to lower the seat, to the left to displace the seat aft in the car, to the right to displace the seat forward in the car, or either end of the seat may be raised or lowered to cause one end of the seat to be raised or lowered, or the switch may be rotated to cause one end of the seat to be raised and the other end to be lowered or vice versa.

Figure 2A:
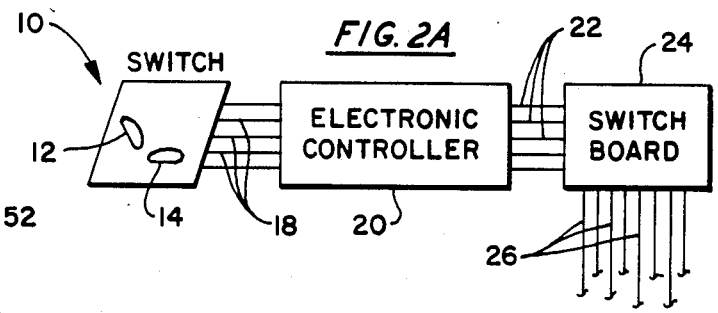
FIG. 2A is a schematic view of the electrical switching portion of a power seat system.
Figure 2B:
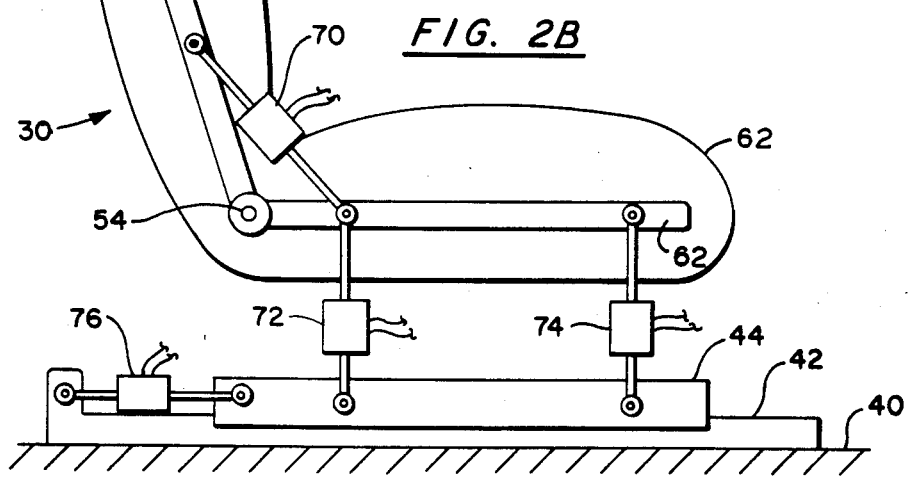
FIG. 2B is a schematic view of a power seat system including the seat switch.

FIG. 2 is a schematic view of a power seat system. This view is not intended to represent any specific system, but merely to show the appropriate components and interconnections. Seat 30 is shown having seat back 50 pivotally connected via pivot connection 54 to seat base 60. Support member 52 runs through seat back 50 and is connected at pivot connection 54 to support member 62 running through seat base 60. The automobile is reflected as car base 40. Extending upwardly from the car base is track 42 on which sliding member 44 is mounted. Motor 76, the forward-aft motor, is connected between the car base and sliding member 44. Forward operation of motor 76 causes seat 30 to be displaced to the right or in a forward direction. Reverse operation of the motor causes the seat to be displaced to the left or in the aft direction. Aft height motor 72 is shown connected between support member 62 and sliding member 44 at the back portion of the seat base. This motor may be operated in either direction to either raise or lower the back end of seat base 60.

Similarly, front height motor 74 is located between sliding member 44 and support member 62 towards the front end of seat base 60. This motor is also bidirectional, and may be operated to either raise or lower the front end of seat base 60.

Seat back motor 70 is connected between support member 62 and support member 52. This motor may be operated in either direction to either raise or lower the seat back relative to the seat bench. Since the seat back is pivotally connected to the seat bench, operation of this motor acts to change the angle of inclination between the seat back and the seat bench.

Also shown on FIG. 2, is seat switch 10 having seat back knob 12 and seat base knob 14. Inputs 18 are shown connecting the seat switch to an electronic controller such as microprocessor 20. Outputs 22 from microprocessor 20 are connected to switch board 24. Switch board 24 would typically have relays or solid state switching devices which would, when appropriate, energize motor outputs 26. These outputs 26 are connected to the various motors such that each motor may be operated in either of two directions. Multiple motors may be operated simultaneously such as both motors 72 and 74 being operated simultaneously to raise or lower seat 30. Motors 72 and 74 could also be operated simultaneously in opposite directions to change the pitch of seat base 60. For instance, aft height motor 72 could be operated to raise the back end of seat base 60 while front height motor 74 is operated to lower the front end of seat base 60 such that the pitch of the seat base is changed.

Figure 3:
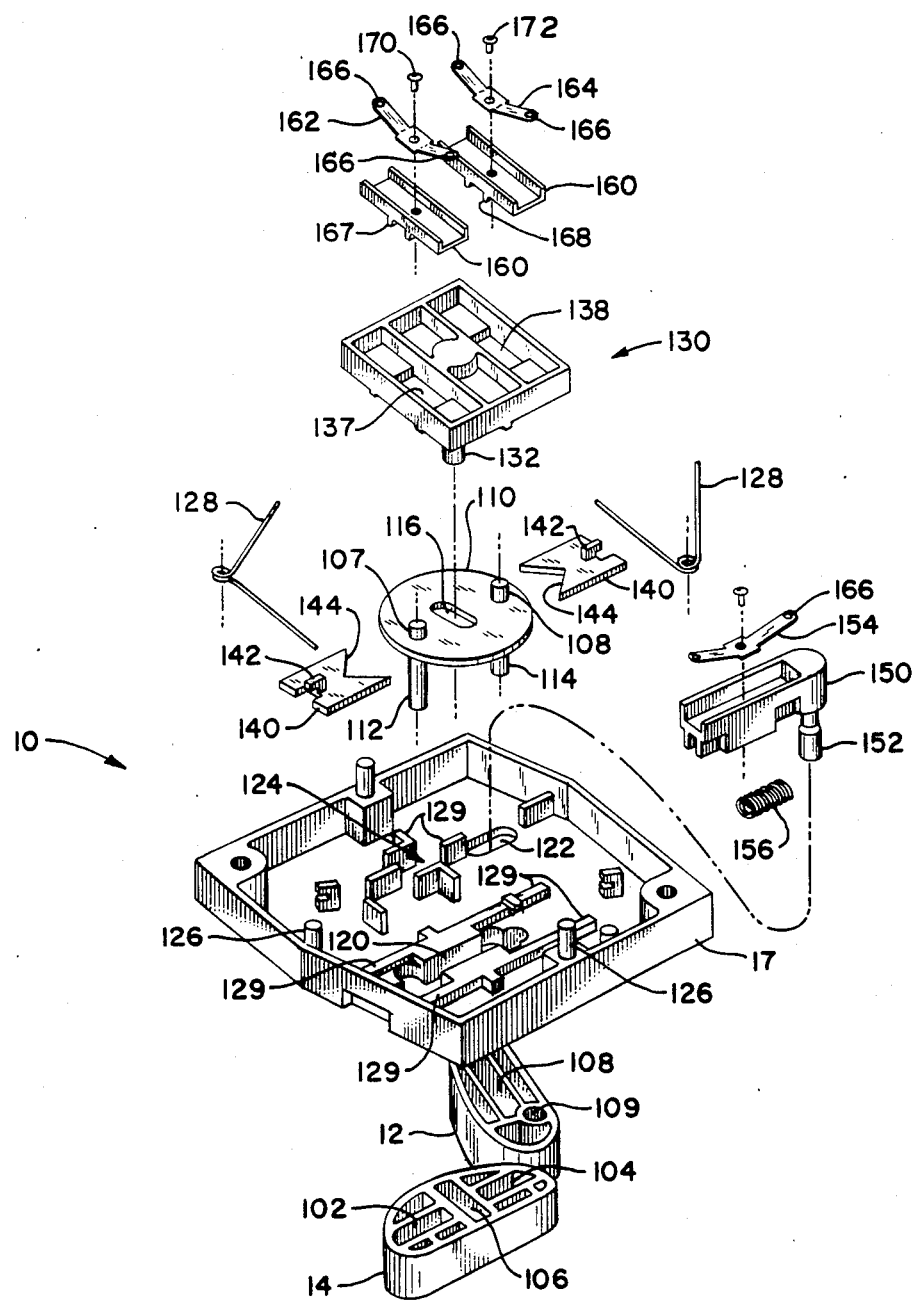
FIG. 3 is an exploded view of a portion of the seat switch including a casing.
Figure 5:
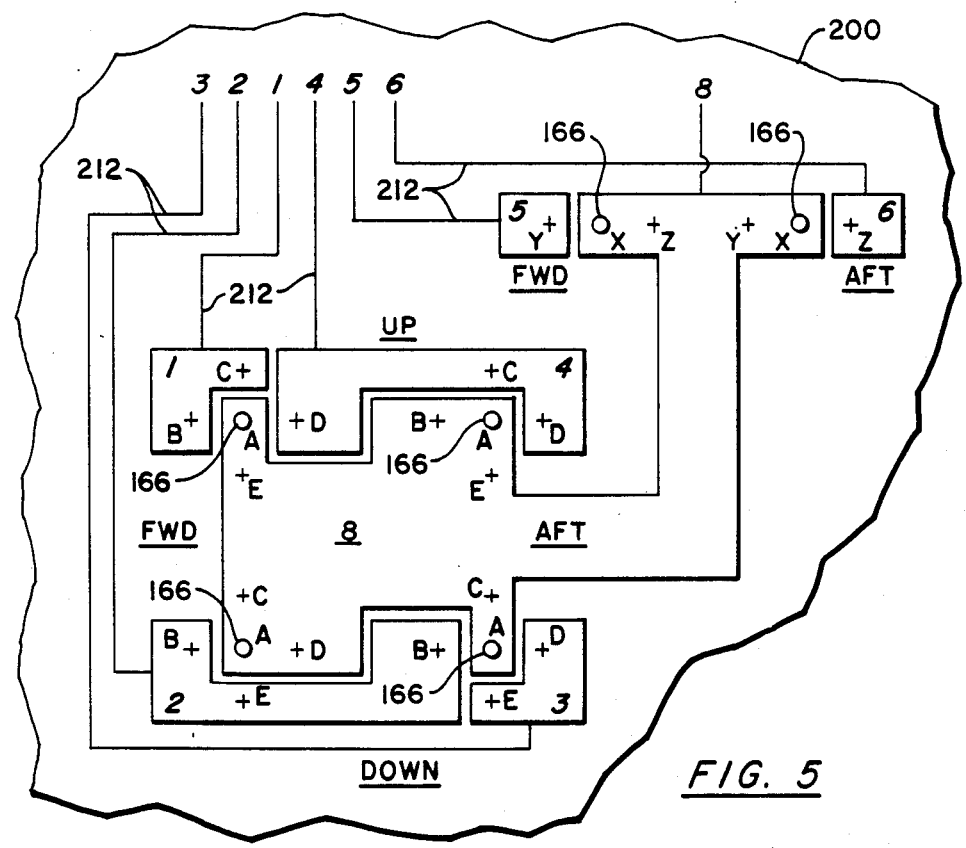
FIG. 5 is a diagrammatic view of the seat switch printed circuit board layout.

Referring now to FIG. 3, there may be seen an exploded view of a portion of seat switch 10. The portion shown in exploded view is the mechanical movement portion. The portion not shown is the contact portion which is shown in FIG. 5.

Starting at the bottom of FIG. 3, it may be seen that bench knob 14 defines a vertically-extending cage pin slot 106 in the center of the knob and two horizontally-extending pin slots 102 and 104, one located on either side of cage pin slot 106. Back rest knob 12 is shown having back rest pin slot 107 extending the length of the knob and a pivotal pin opening 109 for receiving a projection from the casing for providing a pivot point for the knob.

Figure 4:
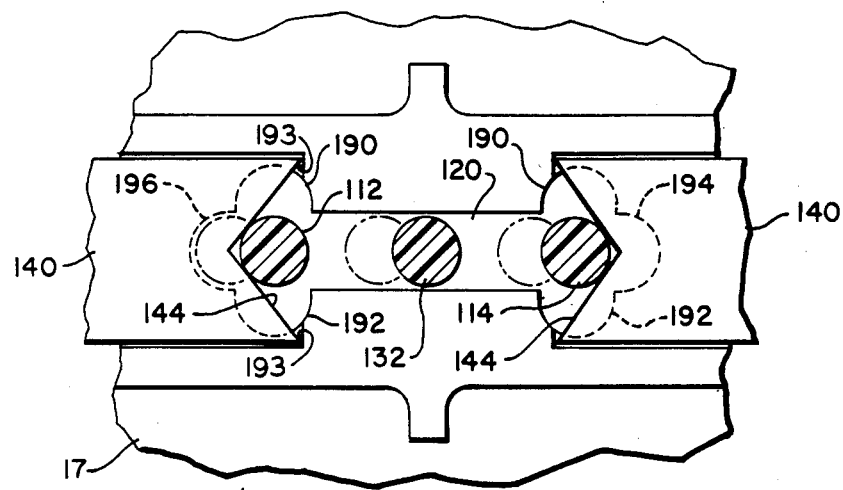
FIG. 4 is a partially cutaway view of an opening in the casing.

Casing 17 is shown having numerous features on the backside thereof. Pin opening 120 may be seen defining an elongated opening having a cloverleaf-type arrangement on either end. FIG. 4 more specifically shows this opening. Located on either side of pin opening 120 are cam guides 129 to which cams 140 are slidably mounted. Casing 17 additionally defines torsion spring embossments 126 to which torsion springs 128 are mounted. Springs 128, when positioned, act to engage spring projections 142, one on each cam, such that the sliding cams are forced toward each other.

Back rest pin opening 122 is formed in the casing adjacent to back rest carrier guides 129. A plurality of back rest carrier guides 129 define a spring position 124 into which spring 156 is secured.

Back rest carrier 150 is shown having back rest pin 152 extending therefrom. When assembled, back rest pin 152 extends through back rest pin opening 122 and is secured within back rest pin slot 107 in back rest knob 12. Hence, it may be seen that pivotal motion of back rest knob 12 about a pivot pin (not shown) extending into back rest opening 109 causes sliding motion of back rest carrier 150. Secured within back rest carrier 150 is back rest contact 154 having contact surfaces 166 extending on either end thereof. Spring 156 is located within an opening on back rest carrier 150 (not shown). The spring is secured within spring position 124 and within a portion of the back rest carrier which is secured to slide between back rest carrier guides 129. Displacement in either direction of the back rest carrier acts to compress the spring against one of back rest carriers 129 which directs the back rest carrier back to the neutral position. The back rest contacts are displaced only when the knob is displaced, acting to displace the back rest carrier. The spring acts to return the switch and knob to a neutral position wherein the contacts are not engaged to generate a signal resulting in motion operation.

Up and down driver 110 is generally flat and circular in configuration to provide planar stability and defines a central elongated opening 116. Additionally, up and down driver 110 has pins 112 and 114 extending downwardly therefrom, said pins extend through pin opening 120 and engage appropriate pin slots 102 and 104 of the seat bench knob. Extending from the opposite side of up and down driver 110 from pins 112 and 114 are projections 107 and 108. Cams 140 are shown located one on either side of the up-down driver and each defines a spring projection 142 for engagement with one of the torsion springs. Each cam additionally defines engagement slot 144 into which pins 112 and 114 are received. Hence, in the neutral position the cam is biased against the carrier guide at carrier guide contact surface 193 to secure the pin with the torsion spring. Since the cam motion is limited by the cam guides, the spring acts to displace the up and down driver until pins 112 and 114 are centered in the engagement slots. Upon displacement of the up and down driver in either direction, the appropriate cam is displaced against the spring until such time as the knob is released allowing the spring to return the up and down driver to the neutral position. As may be seen in FIG. 5, opening 120 physically defines appropriate areas for allowing the pins to be displaced upwardly and downwardly, as well as to left and right.

Cage assembly 130 is mounted to up and down driver 110 and includes cage pin 132 which extends through opening 116, through pin opening 120 and engages cage pin slot 106 of the seat bench knob. Additionally, defined by cage assembly 130 are projection slots 137 and 138 into which projections 107 and 108 extend. Carriers 160 are mounted for sliding motion within the projection slots and include projections 167 and 168 which mate with projections 107 and 108. In this manner, rotary displacement or simultaneous up or down displacement of both ends of the up and down driver with the accompanying projections will cause the carriers to slide vertically within the cage assembly. Carriers 160 have contacts 162 and 164 mounted thereto by rivets 170 and 172. Each contact includes contact surfaces 166 located at either end thereof. Hence, it may be seen that displacement of the seat bench knob may effect displacement of the up and down driver, and the carriers within the cage assembly. Naturally, displacement of the seat bench knob in the fore and aft directions causes the cage assembly and carriers to move laterally driven by slot 116 in the driver.

FIG. 4 is a partially cutaway exploded view of casing 17 and pin opening 120. It may be seen that the pin opening has an elongated shape with a cloverleaf-type formation at either end. The pin opening includes down portions 192, up portions 190, a forward portion 194 and aft portion 196. Pins 112 and 114 extending from the up-down driver are shown located at either end of the pin opening and cage pin 132 is shown at the center of the opening. Additionally, shown are cams 140 each defining an engagement slot 144. It may be seen that pin 112 abuts cam 140 at the center of the engagement slot 144 when in the neutral position. Pin 114 does likewise on the opposite side of the pin opening.

Shown in phantom are the appropriate positions of the three pins if the bench knob were moved to the left indicating that movement in the aft direction of the seat bench was desired. In this instance, all three pins are displaced to the left and the cam 140 is likewise displaced to the left by pin 112 against the action of spring 128. When in this position it may be seen that pin 114 is contained within a narrow portion of opening 120 such that pin 114 may not be displaced in an up-down direction. Additionally, since pin 112 is now in aft portion 196 of the opening, it may not be displaced in an up-down direction either. Hence, the physical dimensioning of pin opening 120 prevents the switch from sending an output indicating simultaneous fore, aft and up-down motion is desired. In other words, if the switch is moved to the aft position, it may not be moved upwardly or downwardly. In like manner, if the switch is moved to the forward position, it may not be moved upwardly or downwardly.

If it is desired to move the switch upwardly, the knob is displaced upwardly and pins 112 and 114 are displaced upwardly. By these pins being displaced, the up-down driver is displaced which acts to displace carriers 160 within the cage assembly. The cage assembly, however, is not displaced, since cage pin 132 is secured within opening 120. In like manner if it desired to only move one end of the seat bench knob upwardly or downwardly, then a single end of the seat bench knob is displaced and the other two pins remain in the neutral position. For instance, displacing one end of seat bench knob 12 might cause pin slot 104 to be displaced which effectively displaces pin 114, which displaces projection 108, which causes carrier 160 to be slid within cage assembly 130 to displace the appropriate contact. However, cage pin 132 is not displaced since it slides within elongated opening 116 of the up-down driver. Pin 112 is likewise not displaced.

It may also be seen from the combination of FIGS. 3 and 4 that any displacement of either pin in the switch in the up-down or left-right direction as seen in FIG. 4, causes displacement of one of the cams against the appropriate torsion spring. The torsion spring always acts to direct the cam back towards the cage pin. The cam acting through engagement slot 144 contacting pin 112 acts to return the switch to the neutral position.

FIG. 5 is a view of printed circuit board 200 showing the appropriate pads and conductor runs for making the desired connections. Contacts 166 are referenced by circles drawn in common pad 8. It may be seen in the square portion of common pad located to the bottom left, that there are four contact surfaces 166 which engage the common pad in the neutral position, and at the upper right there are two contact surfaces 166 which engage the common pad in the neutral position. Spaced around the central neutral portion of common pad at the seat bench portion of the switch are four pads numbered 1 through 4. Likewise, pads 5 and 6 are spaced on either side of the back rest portion of the contact surface. Appropriate conductor runs 212 labeled 1 through 6 are each connected to one of the numbered pads.

Referring to the seat bench portion of the pads, each neutral position of a contact surface engaging the pad is labeled A. Spaced about each neutral position A are positions B, C, D and E. Each position represents displacement of a contact surface caused by displacement of the seat bench knob. The contact surfaces and the contact pads are so arranged that each motion of the switch results in a separate connection being made. By making appropriate connections between the pads, appropriate signals are indicated on the conductor runs which may be interpreted to indicate the desired motion.

If it is desired to displace the seat bench in the aft direction, then the switch is displaced in that direction and contacts are switched to position D. In this position, it may seen that one contact is engaged to common pad 8, two to pad 4 and one to pad 3. In this manner pads 3 and 4 are connected to common and an appropriate signal is generated. If motion is desired in the forward direction, then the switch is displaced to position B. In this position four contact surfaces are connected, one to a common pad 8, two to pad 2 and one to pad 1. Hence, pads 1 and 2 are connected to common and a signal is generated.

If it is desired to move the seat in the upward direction, then the switch is moved to position C. In position C two contact surfaces contact the common pad, and one each contacts pads 1 and 4. This connection is interpreted to request motion of the seat in the upward direction. In a similar manner, when motion is desired in a downward direction, the switch is moved downwardly to position E. In this position, two contact surfaces contact the common pad and one each contacts pads 2 and 3 indicating motion is desired in a downward direction.

If it is desired to move only one end of the seat bench in either direction, then only one set of contacts is moved. For instance, if it is desired to move the forward end of the seat bench in an upward direction, then the set of contacts to the left side of the bench portion of the drawing are moved upwardly to the C position such that three contact surfaces are now contacting the common pad and one contacts pad 1. In like manner, either end of the seat bench may be moved in a single direction. When it is desired to move both ends of the seat bench in opposite directions, then one set of contacts is moved upwardly and one downwardly, as for instance, one set of contacts being in a C position and one in the E position such that two contacts mate with the common pad, and one each with pads 1 and 3.

FIG. 6 is a table of seat base switch contacts and the appropriate action desired when the appropriate contacts are made. In FIG. 6, a "1" indicates that contact is engaged with that pad and a "0" indicates that a contact does not engage that pad. In this sense a set of digital signals are generated by the switch. These signals are directed over runs 212 through outputs 1 through 6 and may be interpreted by the microprocessor to determine the desired seat motion.

In a similar manner the seat back or back rest portion is shown at the upper right of FIG. 5. Contact pads 5 and 6 are shown located on either side of the neutral position (X position) where contact surfaces 166 engage the common pad. When it is desired to move the back rest in the forward direction the contact surfaces are moved to the Z position, making contact between common pad 8 and pad 6. When it is desired to move the seat back in the backward direction, the back knob is displaced to move contacts 166 to the Y position such that common pad 8 and pad 5 are connected. In this manner an appropriate signal is sent to indicate the desired motion of the seat back.

Figure 7:
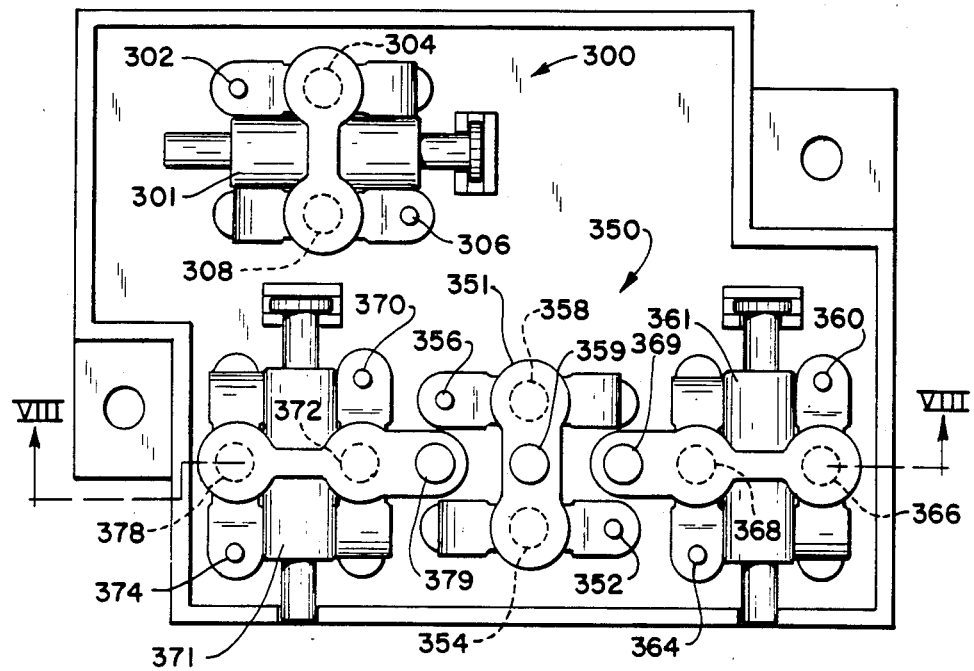
FIG. 7 is a top view of a prior art seat switch.
Figure 8:
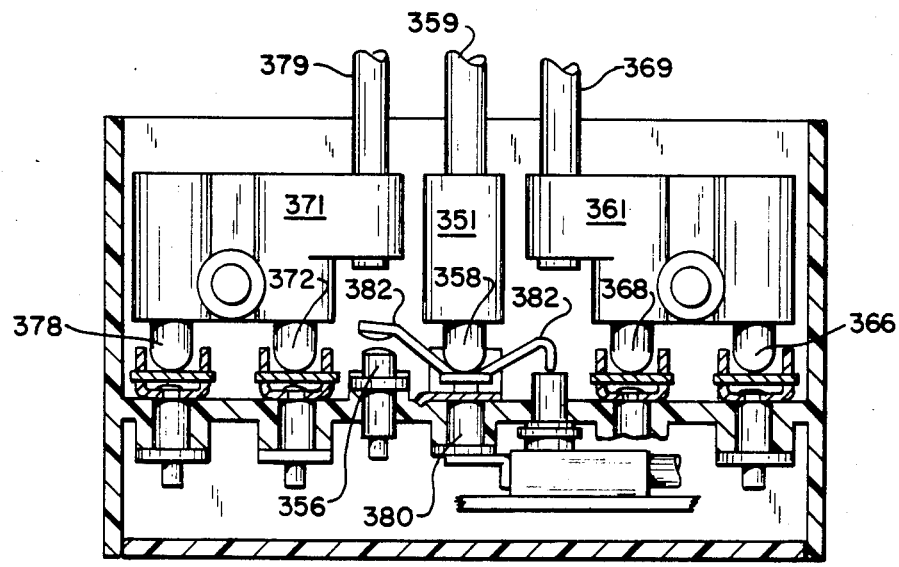
FIG. 8 is a sectional view of FIG. 7 taken along line VIII—VIII.

FIGS. 7 and 8 disclose a prior art switch. FIG. 7 is a top view of the switch with the cover removed showing the appropriate contact arrangements. In the switch it may be seen that there are eight contacts, each having an appropriate actuator for engaging the contact to make an electrical circuit. This switch includes actuator knobs (not shown) of the type disclosed in FIG. 1 herein.

Looking at the top left portion of FIG. 7, there may be seen seat back switch 300. This switch has pin (not shown) which extends upwardly to be engaged by the seat back knob. When pin 309 is displaced, it causes linkage 301 to likewise be displaced. When the linkage is displaced in one direction, actuator 304 displaces a rocker arm to engage aft contact 302 to make an appropriate electrical contact. When it is displaced in the other direction, linkage 301 causes actuator 308 to cause another rocker arm to engage fore contact 306 to make an appropriate electrical contact.

Seat base switch portion 350 is shown at the bottom of FIG. 7. Pins 379, 359 and 369 all extend upwardly at the center portion and all engage a seat bench knob as shown herein. Linkage 351 connects pin 359 to actuator 354 and 358. Displacement of pin 359 in the left direction causes actuator 358 to displace a rocker arm to engage contact 356 to cause aft motion of the seat. Displacement of pin 359 in the right direction causes linkage 351 to displace actuator 354, which displaces a rocker arm to engage forward contact 352 to cause the seat to be displaced in a forward direction.

In a similar manner pin 369 is connected to linkage 361 which, upon appropriate displacement, causes actuator 368 to displace a rocker arm to engage lower contact 364. Displacement in the opposite direction causes actuator 366 to displace a rocker arm to engage raise contact 360.

In similar manner pin 379 is connected through linkage 371 to cause actuator 378 to displace a rocker arm to engage contact 374 when it is desired to lower the back end of the seat, and to displace a rocker arm actuator 372 to engage contact 370 when operation of the back end is desired in the opposite direction.

FIG. 8 is a sectional view of FIG. 7 taken at line VIII-VIII. Therein it may be seen that pins 369, 359 and 379 extend upwardly and are connected appropriately to linkages 361, 371 and 351. Actuator 358 is shown extending from linkage 351 and engages rocker arm 382. When pin 359 is displaced, actuator 358 is moved to the left to cause rocker arm 382 to make electrical contact between power supply 380 and contact 356. In this manner actuation of the pin through the linkage through the actuator causes electrical contact to be made. Linkage 371 is shown connected to actuators 372 and 378. Each actuator is likewise in position relative to the appropriate rocker arm to make the appropriate contacts when displaced in the appropriate direction. Pin 369 is connected through linkage 361 to actuators 366 and 368 in a similar manner.

As may be seen the prior art device is extremely complicated and includes pins connected to linkages, connected to actuators, and said actuators engaging a rocker arm for each desired function. Each rocker arm makes electrical contacts when appropriately actuated. It may be seen that the switch has numerous parts, is of great complexity and requires significant size.

The herein invention is designed to be an improvement over this switch and instead of all the mechanical rocker arms, actuators and linkages, utilizes a complex displacement mechanism to cause contact surfaces to be displaced relative to pads on a printed circuit board. A few number of contacts are utilized and a greatly simplified switch is provided.

The invention has been described with reference to a particular embodiment. It is to be understood by those skilled in the art that variations can be effected within the spirit and scope of the invention.

I claim:

1. A seat switch for providing positioning signals as an input to a control system for positioning an automotive seat which comprises:
 a seat-base shaped, seat base switch knob which defines a centered, vertically-elongated cage pin slot and two horizontal pin slots, one on either side of the cage pin slot, said knob being capable of horizontal, vertical and rotational motion;
 a case defining a pin opening and including cam guides and torsion spring embossments;
 an up-down driver mounted on one side of the casing, said driver including a pair of pins projecting through the pin opening in the casing and one each being engaged in the horizontal slots of the knob, said driver further including a pair of spaced projections extending in the opposite direction and including a vertically elongated central opening;
 sliding cams secured for sliding movement within the casing cam guides, each of said cams defining a V-shaped engagement slot which mates with a respective driver pin such that displacement of the driver causes displacement of at least one cam;
 spring means mounted to the casing torsion spring embossments and positioned to displace the cam against the respective driver pins such that the cams are biased to a neutral positon to thereby bias the up-down dirver to a neutral position;
 a cage assembly defining a pair of projection slots and a cage pin, said cage pine extending through the driver opening and through the casing opening to be engaged within the cage pin slot defined by the knob;
 a pair of carriers each slidably mounted to the cage assembly and each having a projection extending through the cage assembly projection slots and engaging an up-down driver projection such that displacement of the up-down driver causes sliding displacement of at least one carrier within the cage assembly;
 a pair of electrical contacts, each having two spaced-apart contact surfaces, one contact being secured with each carrier; and
 a pattern of electrical contact pads positioned to be engaged by the electrical contacts, said contact pads and said electrical contacts generating a different positioning signal for each desired motion of the seat depending on the position of the seat base switch knob.

2. The apparatus as set forth in claim 1 and further comprising:
 said casing defining a seat back pin opening;
 a seat back carrier mounted to the casing and including a seat back pin extending through the seat back pin opening and engaged by a seat back knob for effecting displacement of the seat back carrier;
 an electrical contact having spaced-apart contact surfaces secured within the seat back carrier; and
 a pattern of electrical contact pads positioned to be engaged by the electrical contacts, said contact pads and said electrical contacts generating appropriate positioning signals for each desired motion of the seat depending on the position of the seat back knob.

3. The apparatus a set forth in claim 1 wherein the pattern of electrical contact pads is a pattern formed as a portion of a printed circuit board and includes conductor runs for conducting the positioning signals from the contact pads.

4. A switch for controlling the positioning of apparatus, said switch generating an appropriate signal to cause the apparatus to be displaced in the same direction that the switch knob is displaced, and said switch knob being capable of horizontal and vertical motion as ell as one or both ends of the switch being capable of relative rotational motion, the improvement comprising:
 said switch including two contacts each having two contact surfaces;
 means mechanically connecting the contacts with the switch knob such that vertical and horizontal motion of the switch knob displaces all four contact surfaces vertically or horizontally, such that relative rotation of a first end of the knob without displacement of the other end of the knob displaces one contact, and such that relative rotation of the other end of the knob without displacement of the first end of the knob displaces the other contact; and
 a pattern of electrical contact pads positioned to be engaged by the electrical contacts, said pattern being arranged relative to the contacts such that displacement of the knob in any direction of motion causes the contacts to engage the pads in a pattern indicative of the motion imparted to the knob whereby an appropriate signal is generated.

5. The apparatus as set forth in claim 4 wherein the pattern of electrical contact pads includes four pads arranged about a common pad corresponding to a neutral position of the electrical contacts.

6. The apparatus as set forth in claim 5 wherein the contacts connect the common pad to two other pads when the knob is displaced upwardly or downwardly.

7. The apparatus as set forth in claim 6 wherein the contacts connect the common pad to two other pads when the knob is displaced in the forward or aft directions.

8. The apparatus as set forth in claim 4 wherein the contacts connect the common pad to only one other pad when one end of the knob is rotated.

9. The apparatus as set forth in claim 4 wherein said pattern of electrical contact pads comprises a plurality of contact pads arranged as shown in FIG. 5.

10. The apparatus as set forth in claim 4 wherein the pattern of electrical contact pads is formed on a printed circuit board.

11. The apparatus as set forth in claim 4 and further comprising:
limitation means positioned to prevent rotational displacement of the knob when the knob has been displaced horizontally.

12. A power seat system for controlling the positioning of a seat in a vehicle, said seat having a bench portion and a back rest portion which comprises:
a seat having a seat bench and a seat back pivotally mounted to the seat bench;
motive means connected between the vehicle and the seat to effect fore and aft movement of the seat, up and down movement at both the front and back of the seat bench and fore and aft movement of the seat back;
control means connected to receive input signals and connected to the motive means for supplying power to selected portions of the motive means for effecting the desired positioning of the seat based on input signals received; and
a seat switch for generating the input signals for the control means including a bench knob simulating the bench portion of the seat, said bench knob being capable of up movement, down movement, fore movement, rotational movement at either end without rotational movement at the other end, and rotational movement at both ends simultaneously, said bench being connected to displace a plurality of moveable contacts relative to a pattern of fixed contact pads, said contacts and contact pads acting to generate an appropriate input signal to the control means based on the position of the bench knob to control the position of the bench portion of the seat.

13. The apparatus as set forth in claim 12 wherein the seat switch further comprises a back rest knob simulating the back rest portion of the seat, said back rest knob being capable of fore and aft pivotal motion to simulate the desired motion of the seat, said back rest knob being connected to displace a plurality of movebale contacts relative to a pattern of fixed contact pads, said contacts and contact pads generating an input signal to the control means based on the position of the back rest knob to control the back rest portion of the seat.

14. The apparatus as set forth in claim 12 wherein the plurality of contacts comprises two contacts each having two contact surfaces and wherein the pattern of contact pads includes a common pad and a plurality of pads spaced about the common pad.

15. The apparatus as set forth in claim 14 wherein the contact surfaces engage the contact pads to send separate and distinct input signals to the control means to effect appropriate control of the seat when the seat bench knob is placed in the following positions:
(a) both ends of knob raised;
(b) front end of knob raised;
(c) back end of knob raised;
(d) both ends of knob lowered;
(e) back end of knob lowered;
(f) front end of knob lowered;
(g) knob moved aft;
(h) knob moved forward;
(i) front end of knob raised and back end of knob lowered; and
(j) back end of knob raised and front end of knob lowered.

16. The apparatus as set forth in claim 15 wherein the contact pads include four pads spaced about the common pad.

17. The apparatus as set forth in claim 13 wherein the back rest knob displaces contacts relative to two contact pads, one on either side of a common contact pad.

18. The apparatus as set forth in claim 16 wherein all the pads are formed on a printed circuit board and wherein the contacts are positioned to be displaced along the circuit board when the seat bench knob is displaced.

19. The apparatus as set forth in claim 15 wherein the control means further comprises a programmed microprocessor capable of receiving inputs and of generating an appropriate output signal to energize the appropriate selected portion of the motive means.

20. The apparatus as set forth in claim 19 wherein the pattern of contact pads comprise a common pad and four pads spaced about the common pad, and wherein the contacts appropriately connect the common pad to the other pads to indicate the motion desired, wherein all the pads are formed on a printed circuit board and wherein a conductor run extends from each pad to carry the input signal from the pad to the control means.

* * * * *

UNITED STATES PATENT AND TRADEMARK OFFICE
CERTIFICATE OF CORRECTION

PATENT NO. : 4,695,682
DATED : September 22, 1987
INVENTOR(S) : Ray F. Winogrocki It is certified that error appears in the above-identified patent and that said Letters Patent is hereby corrected as shown below:

Please insert:
Item (73): Assignee: United Technologies Automotive, Inc.

Column 10, line 26, after "apparatus" change "a" to "as"

Column 10, line 35, after "motion as" change "ell" to "well"

Column 11, line 34, after "movement," (first occurrence), insert --aft movement--

Column 11, line 49, after "plurality of" change "movebale" to "moveable"

Signed and Sealed this

Twenty-first Day of March, 1989

Attest:

DONALD J. QUIGG

*Attesting Officer*  *Commissioner of Patents and Trademarks*